(12) United States Patent
Gu et al.

(10) Patent No.: US 10,057,586 B2
(45) Date of Patent: Aug. 21, 2018

(54) METHOD AND DEVICE FOR PROVIDING DEPTH BASED BLOCK PARTITIONING IN HIGH EFFICIENCY VIDEO CODING

(71) Applicants: Futurewei Technologies, Inc., Plano, TX (US); Santa Clara University, Santa Clara, CA (US)

(72) Inventors: Zhouye Gu, San Jose, CA (US); Jianhua Zheng, Beijing (CN); Nam Ling, San Jose, CA (US); Chen-Xiong Zhang, Plano, TX (US)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 103 days.

(21) Appl. No.: 14/752,072

(22) Filed: Jun. 26, 2015

(65) Prior Publication Data

US 2015/0382025 A1 Dec. 31, 2015

Related U.S. Application Data

(60) Provisional application No. 62/017,637, filed on Jun. 26, 2014.

(51) Int. Cl.
*H04N 19/117* (2014.01)
*H04N 19/182* (2014.01)
(Continued)

(52) U.S. Cl.
CPC ......... *H04N 19/182* (2014.11); *H04N 19/117* (2014.11); *H04N 19/14* (2014.11);
(Continued)

(58) Field of Classification Search
CPC ............................ H04N 19/182; H04N 19/117
See application file for complete search history.

(56) References Cited

U.S. PATENT DOCUMENTS 9,361,679 B2 * 6/2016 Aydin .................. G06T 5/009
9,626,569 B2 * 4/2017 Mercier ............ G06K 9/00711
(Continued)

FOREIGN PATENT DOCUMENTS

| CN | 102448563 | 5/2012 |
| CN | 102763415 | 10/2012 |

(Continued)

OTHER PUBLICATIONS

"International Application No. PCT/US2015/038037, International Search Report and Written Opinion dated Sep. 16, 2015", (Sep. 16, 2015), 10 pgs.

(Continued)

*Primary Examiner* — Jay Patel
*Assistant Examiner* — Irfan Habib
(74) *Attorney, Agent, or Firm* — Schwegman Lundberg & Woessner, P.A.

(57) ABSTRACT

Depth based block partitioning in high efficiency video coding is provided by partitioning a video image block into different partitions using a binary segmentation mask. A determination is made whether to filter pixels at a boundary between the partitions. A particular pixel is not filtered in response to each adjacent pixel in vertical and horizontal planes in relation to the particular pixel having a same value. The particular pixel is filtered in response to any adjacent pixel in the vertical and horizontal planes in relation to the particular pixel having a different value than any other adjacent pixel in the vertical and horizontal planes in relation to the particular pixel. Pixels are filtered pursuant to a filtering process in response to a filtering determination.

19 Claims, 10 Drawing Sheets

(51) Int. Cl.
*H04N 19/14* (2014.01)
*H04N 19/597* (2014.01)
*H04N 19/543* (2014.01)
*H04N 19/119* (2014.01)
*H04N 19/17* (2014.01)

(52) U.S. Cl.
CPC ......... *H04N 19/543* (2014.11); *H04N 19/597* (2014.11); *H04N 19/119* (2014.11); *H04N 19/17* (2014.11)

(56) References Cited

U.S. PATENT DOCUMENTS

| | | | |
|---|---|---|---|
| 9,930,366 B2* | 3/2018 | Zheng | H04N 19/85 |
| 2005/0100237 A1* | 5/2005 | Kong | H04N 19/176 |
| | | | 382/261 |
| 2006/0034519 A1* | 2/2006 | Toyama | G06K 9/38 |
| | | | 382/224 |
| 2007/0160308 A1* | 7/2007 | Jones | G06K 9/0061 |
| | | | 382/260 |
| 2010/0302365 A1 | 12/2010 | Finocchio et al. | |
| 2011/0019082 A1* | 1/2011 | Su | G06T 5/002 |
| | | | 348/441 |
| 2011/0200111 A1 | 8/2011 | Chen et al. | |
| 2011/0249190 A1* | 10/2011 | Nguyen | H04N 5/272 |
| | | | 348/708 |
| 2013/0022103 A1* | 1/2013 | Budagavi | H04N 19/176 |
| | | | 375/240.02 |
| 2014/0055560 A1* | 2/2014 | Fu | H04N 13/0022 |
| | | | 348/42 |
| 2014/0270562 A1* | 9/2014 | Neal | G06T 5/002 |
| | | | 382/254 |
| 2016/0050419 A1* | 2/2016 | Zhao | H04N 19/597 |
| | | | 375/240.12 |
| 2016/0073094 A1* | 3/2016 | Kang | H04N 13/0221 |
| | | | 348/50 |
| 2016/0212446 A1* | 7/2016 | Liu | H04N 19/597 |
| 2017/0134750 A1 | 5/2017 | Ikai et al. | |
| 2017/0201770 A1 | 7/2017 | Chen et al. | |

FOREIGN PATENT DOCUMENTS

| | | |
|---|---|---|
| JP | 2014126219 | 7/2014 |
| WO | WO-2015194669 | 12/2015 |

OTHER PUBLICATIONS

Chen, Ying, et al., "Test Model 8 of 3D-HEVC and MV-HEVC", Joint Collaborative Team on 3D Video Coding Extension Development of ITU-T SG 16 WP 3 and ISO/IEC JTC 1/SC 29/WG 11; 8th Meeting: Valencia, ES, Mar. 29-Apr. 4, 2014, (Mar. 29, 2014), 54 pgs.

"European Application No. 15811306.8, Extended European Search Report dated May 29, 2017", (May 29, 2017), 7 pgs.

Gu, Zhouye, et al., "On DBBP Filtering Simplification", Joint Collaborative Team on 3D Video Coding Extensions of ITU-T SG 16 WP 3 and ISO/IEC JTC 1/SC 29/WG 11; 9th Meeting: Sapporo, JP, Jul. 3-9, 2014, (6/27/204), 4 pgs.

Jager, Fabian, "Depth-based Block Partitioning for 3D Video Coding", 2013 Picture Coding Symposium (PCS), IEEE, Dec. 8, 2013, (Dec. 8, 2013), 410-413.

Lee, Jin Young, et al., "Partition boundary filtering in DBBP", Joint Collaborative Team on 3D Video Coding Extensions of ITU-T SG 16 WP 3 and ISO/IEC JTC 1/SC 29/WG 11; 8th Meeting: Valencia, ES, Mar. 29-Apr. 4, 2014, (Mar. 21, 2014), 4 pgs.

"Chines Application No. 201580028665.6, Chinese First Office Action dated Nov. 8, 2017", (Nov. 8, 2017), 18 pgs.

"Japanese Application No. 2017-520757, Notice of Reasons for Rejection dated Dec. 22, 2017", (Dec. 22, 2017), 7 pgs.

* cited by examiner

METHOD AND DEVICE FOR PROVIDING DEPTH BASED BLOCK PARTITIONING IN HIGH EFFICIENCY VIDEO CODING

CROSS-REFERENCE TO RELATED APPLICATIONS

This application claims the benefit of U.S. Provisional Application No. 62/017,637 filed Jun. 26, 2014 entitled METHOD OF DEPTH BASED BLOCK PARTITIONING, which is hereby incorporated herein by reference as if reproduced in its entirety.

TECHNICAL FIELD

This disclosure relates in general to High Efficiency Video Coding techniques and more particularly to a method and device for providing depth based block partitioning in High Efficiency Video Coding (HEVC).

BACKGROUND

In Depth Based Block Partitioning (DBBP) of the current 3D HEVC standard, an arbitrary shaped block partitioning for the collocated texture block is derived from a binary segmentation mask computed by the corresponding depth block. Two partitions are motion-compensated and then merged by averaging them based on the depth based binary segmentation mask. A filtering process is then applied. Currently, unnecessary filtering processes are applied to the merged partitions.

SUMMARY

From the foregoing, it may be appreciated by those skilled in the art that a need has arisen to simplify pixel filtering performed by an inter prediction unit in three dimensional video encoders and decoders. In accordance with the present disclosure, a method and device for providing depth based block partitioning in high efficiency video coding are provided that greatly reduce and substantially eliminate the problems associated with conventional encoder and decoder processing implementations.

According to an embodiment, a method for providing depth based block partitioning in high efficiency video coding is provided by obtaining a binary mask based on a depth block corresponding to a current texture block, in which the binary mask is used for the texture block partitioning. The current texture block is partitioned according to the binary mask. Values of adjacent pixels of the binary mask in vertical and horizontal planes in relation to a particular pixel at the block partition boundary between different partitions in the current texture block are checked. Pixel processing is performed to filter the particular pixel according to the values of the adjacent pixels. The particular pixel is not filtered in response to each adjacent pixel in vertical and horizontal planes in relation to the particular pixel having a same value. The particular pixel is filtered in response to any adjacent pixel in the vertical and horizontal planes in relation to the particular pixel having a different value than any other adjacent pixel in the vertical and horizontal planes in relation to the particular pixel. The particular pixel is filtered pursuant to a filtering process in response to the filtering determination.

The present disclosure describes many technical advantages over conventional video encoding techniques. For example, one technical advantage is to simplify the number of conditions where boundary pixels are filtered upon performing depth based block partitioning. Another technical advantage is to implement particular filtering processes on those pixels satisfying the filtering conditions. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

In general, this disclosure relates to techniques for encoding and decoding depth data for three-dimensional (3D) video data using various depth coding modes under the HEVC standard. Captured views (e.g., textures) of the 3D video data are associated with corresponding depth maps that describe depth data for the texture data. In accordance with a 3D video coding process, such as a 3D-HEVC process, the texture views and depth maps may be coded and multiplexed into a 3D video bitstream.

Figure 1:
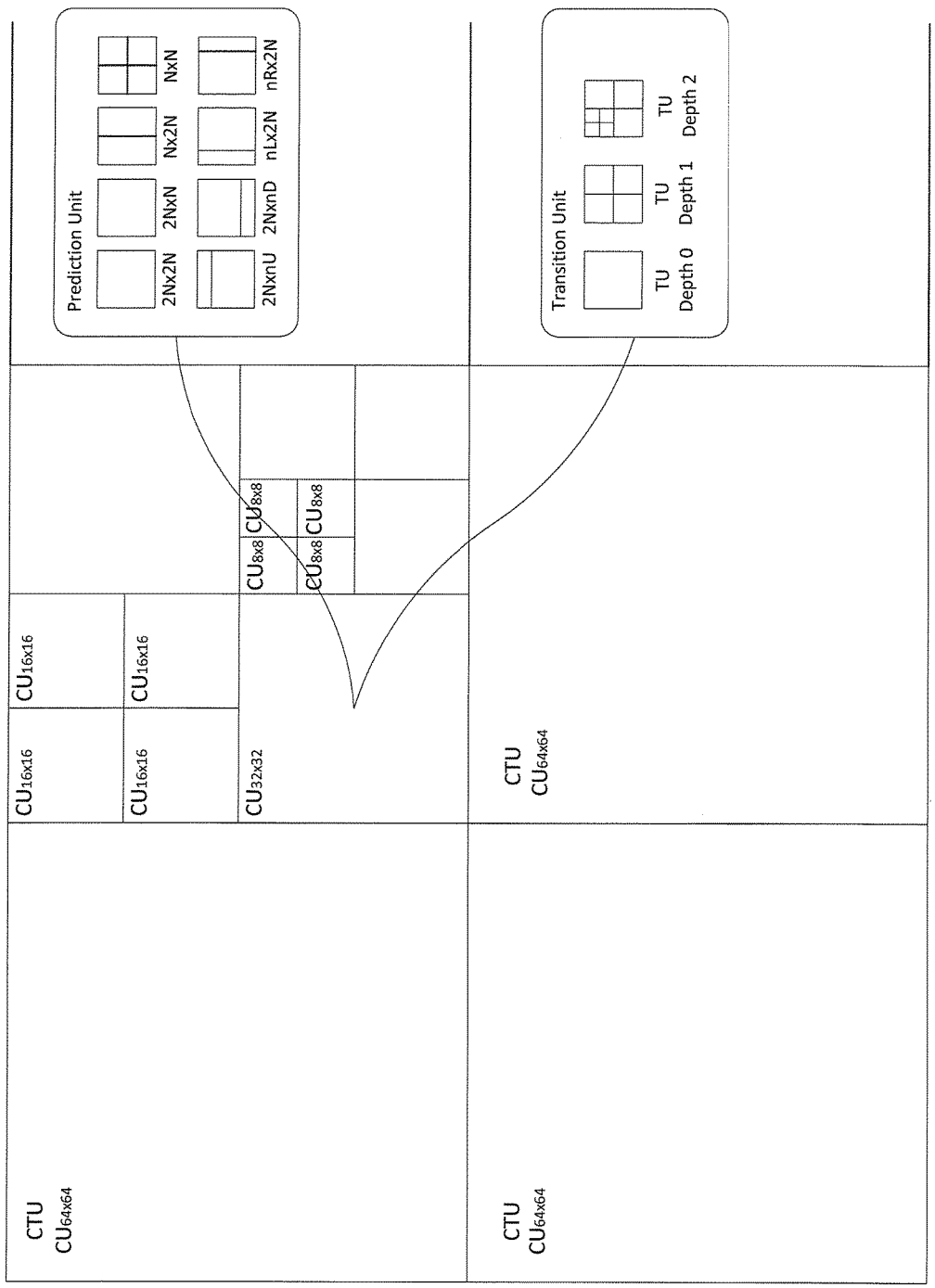
FIG. 1 illustrates a quadtree coding structure implemented in High Efficiency Video Coding (HEVC)

FIG. 1 shows a quadtree coding structure implemented in High Efficiency Video Coding (HEVC). The HEVC standard employs a highly flexible quadtree coding structure where a video picture or frame may be divided into a sequence of Coding Tree Units (CTU) that include luma (Y) and chroma (Cb, Cr) samples. The CTU size can be selected from 64×64, 32×32, and 16×16 in the encoder and specified in a sequence parameter set (SPS). A CTU is employed as the root of the coding tree and each leaf of the quadtree is called a Coding Unit (CU). Therefore, one CTU can be partitioned into multiple CUs and each CU specifies one coding category, either intra coding or inter coding. A CU is further split into one, two, or four Prediction Units (PU) that carry the basic information for prediction. For efficient prediction, HEVC defines two intra PU and eight inter PU shapes to support variable size PU. Intra PUs may have 2N×2N and N×N shapes. Inter PU shapes include two square shapes 2N×2N and N×N, two rectangular shapes 2N×N and N×2N, and four asymmetric shapes 2N×nU, 2N×nD, nL×2N, and nR×2N in up, down, left, and right positions respectively. The residual block of each CU can be transformed with a quadtree structure usually called a residual quadtree (RQT) made up of Transfer Units (TU) ranging in size from 4×4 up to 32×32. A TU contains coefficients for spatial block transform and quantization for coding a residual difference between the predicted image and the actual image.

The encoder selects the best coding tree structure, PU subdivision, and RQT configuration through exhaustive computations. For evaluating the compression efficiency of each candidate configuration, the encoder usually employs the Lagrangian multiplier optimization technique, which is expressed by $J = D + \lambda R$, where J is the Lagrangian rate distortion (RD) cost function, D is distortion gain by the sum of square errors of the reconstructed samples against the originals, R is bit-rate of entropy coding, and $\lambda$ is the Lagrangian multiplier connecting R and D in a Lagrangian formulation. The minimization process of the RD cost is known as rate-distortion optimization (RDO) through which bit-rate makes peace with distortion, leading to a trade-off between compression efficiency and picture quality.

Coding efficiency is the ability to encode video at the lowest possible bit rate while maintaining a certain level of video quality. The encoder uses RDO processing to choose the intra coding mode with the minimum value. RDO processing is very time-consuming mainly for two reasons. The first one is that there are too many CU/PU/TU combinations. For example, in intra prediction mode coding only, 35 times of RD cost computation process is performed to decide the mode of a certain PU, since one PU may be coded with one of 35 intra prediction modes containing DC (flat), Planar (surface fitting), and 33 angular modes. The second reason is that the RD-cost calculation is computational intensive. To obtain accurate D and R, for each candidate, the RD-cost computation performed by the encoder encompasses intra prediction, residual calculating, transform, quantization, the entropy coding, inverse transform, inverse quantization, pixel reconstruction, and finally the RD-cost computing.

In general, the HEVC encoder compresses the frames into a compressed video bit stream which can be stored or transmitted. The encoding process begins by partitioning a single picture or frame into multiple CTUs which can be further divided into multiple CUs. Once the picture in the frame has been partitioned, the predicting processes begin where a CU is partitioned further into PUs. The HEVC encoder uses two types of predictions namely intra prediction and inter prediction. Intra prediction predicts PUs from neighboring image data, i.e. from the same picture frame. Inter prediction uses motion compensated prediction to predict PUs referenced from image data in pictures found before or after the current display, i.e. other picture frames in the stream. Any data remaining after prediction is put into a block using a Discrete Cosine Transform (DCT). The difference between the original block and its prediction is transformed by a linear spatial transform. The HEVC encoder applies these blocks to the remaining data in each CU. Finally, the coded bit stream is encoded further using Context Adaptive Binary Arithmetic Coding (CABAC) through a process known as Entropy encoding. This is the final step where the HEVC encoder arranges and compresses the transformed data into its separate components, namely motion vectors, prediction modes, partitioning information, and other header data. Upon being scaled, quantized, and entropy coded, the transform coefficients are transmitted together with the prediction information. At this point the video has been compressed and can be stored.

Upon video transmission, a HEVC decoder decodes the data in order to view images from a video source. By entropy decoding, the HEVC decoder extracts the elements of the encoded sequence. It rescales and inverts the transform stage of the encoding process, units of the picture are restored to their original form, predicted, and the predictions are added to the output of the inverse transform.

The final step to viewing the motion picture is the process of reconstruction of the decoded video for viewing. The encoder duplicates the decoder processing loop such that both will generate identical predictions for subsequent data. The quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures.

Figure 2:
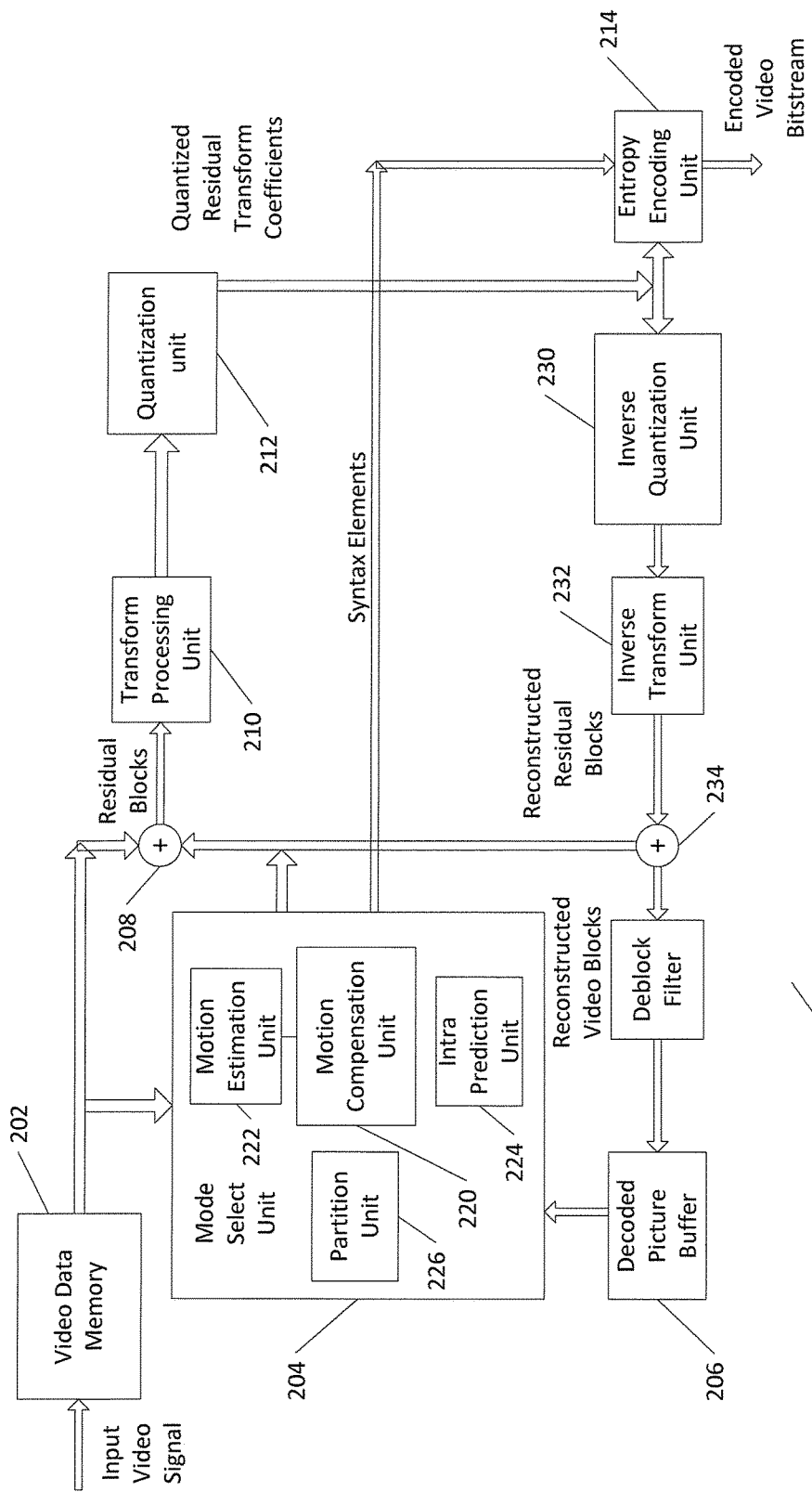
FIG. 2 illustrates a block diagram illustrating an example of a video encoder that may implement techniques for depth data coding.

FIG. 2 is a block diagram illustrating an example of a video encoder 200 that may implement techniques for depth data coding. Video encoder 200 is representative of a device that may be configured to perform techniques for simplified coding modes signaling of depth maps in 3D-HEVC as disclosed herein. Video encoder 200 may perform intra and inter coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra prediction mode (I mode) may refer to any of several spatial based coding modes. Inter prediction modes, such as uni-directional prediction (P mode) or bi-prediction (B mode), may refer to any of several temporal-based coding modes. In addition to encoding texture maps (i.e., luma and chroma values) for each view, video encoder 200 may further encode a depth map for each view.

Video encoder 200 may include a video data memory 202, a mode select unit 204, decoded picture buffer (DPB) 206, summer 208, transform processing unit 210, quantization unit 212, and an entropy encoding unit 214. Mode select unit 204, in turn, includes motion compensation unit 220, motion estimation unit 222, intra prediction unit 224, and partition unit 226. For video block reconstruction, video encoder 200 also includes inverse quantization unit 230, inverse transform unit 232, and summer 234. A deblocking filter 240 may also be included to filter block boundaries and remove blockiness artifacts from reconstructed video. If desired, the deblocking filter 240 would typically filter the output of summer 234. Additional filters (in loop or post loop) may also be used in addition to the deblocking filter. Such filters may filter the output of summer 208 (as an in-loop filter). Example filters may include adaptive loop filters, sample adaptive offset (SAO) filters, or other types of filters.

Video encoder 200 receives a current video block within a video frame to be encoded. Video data memory 202 may store video data to be encoded by the components of video encoder 200. The video data stored in video data memory 202 may be obtained, for example, from a video source. Decoded picture buffer 206 may be a reference picture memory that stores reference video data for use in encoding video data by video encoder 200, e.g., in intra or inter coding modes. Video data memory 202 and decoded picture buffer 206 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 202 and decoded picture buffer 206 may be provided by the same memory device or separate memory devices. In various examples, video data memory 202 may be on-chip with other components of video encoder 200 or off-chip relative to those components.

During the encoding process, video encoder 200 receives a video frame or slice to be coded. The frame or slice may be divided into multiple video blocks. Motion estimation unit 222 and motion compensation unit 220 perform inter-predictive coding of the received video block relative to one or more blocks in one or more reference frames to provide temporal prediction. Intra prediction unit 224 may alternatively perform intra predictive coding of the received video block relative to one or more neighboring blocks in the same frame or slice as the block to be coded to provide spatial prediction. Video encoder 200 may perform multiple coding passes to select an appropriate coding mode for each block of video data.

Moreover, partition unit 226 may partition blocks of video data into sub-blocks, based on evaluation of previous partitioning schemes in previous coding passes. For example, partition unit 226 may initially partition a frame or slice into LCUs, and partition each of the LCUs into sub-CUs based on rate-distortion analysis (e.g., rate-distortion optimization). Mode select unit 204 may further produce a quadtree data structure indicative of partitioning of an LCU into sub-CUs. Leaf-node CUs of the quadtree may include one or more PUs and one or more TUs. Mode select unit 204 may select one of the coding modes, intra or inter, based on error results and provide the resulting intra or inter coded block to summer 208 to generate residual block data and to summer 234 to reconstruct the encoded block for use as a reference frame. Mode select unit 204 also provides syntax elements, such as motion vectors, intra coding mode indicators, partition information, and other such syntax information, for entropy encoding unit 214.

Motion estimation unit 222 and motion compensation unit 220 may be highly integrated, but are illustrated separately for conceptual purposes. Motion estimation, performed by motion estimation unit 222, is the process of generating motion vectors that estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 200 may calculate values for sub-integer pixel positions of reference pictures stored in decoded picture buffer 206. For example, video encoder 200 may interpolate values of one-quarter pixel positions, one-eighth pixel positions, or other fractional pixel positions of the reference picture. Therefore, motion estimation unit 222 may perform a motion search relative to the full pixel positions and fractional pixel positions and output a motion vector with fractional pixel precision.

Motion estimation unit 222 calculates a motion vector for a PU of a video block in an inter-coded slice by comparing the position of the PU to the position of a predictive block of a reference picture. The reference picture may be selected from one of a plurality of reference picture lists, each of which identify one or more reference pictures stored in decoded picture buffer 206. Motion estimation unit 222 generates the calculated motion vector for entropy encoding unit 214 and motion compensation unit 220.

Motion compensation, performed by motion compensation unit 220, may involve fetching or generating the predictive block based on the motion vector determined by motion estimation unit 222. Upon receiving the motion vector for the PU of the current video block, motion compensation unit 220 may locate the predictive block to which the motion vector points in one of the reference picture lists. Summer 208 forms a residual video block by subtracting pixel values of the predictive block from the pixel values of the current video block being coded, forming pixel difference values. In general, motion estimation unit 222 performs motion estimation relative to luma components, and motion compensation unit 220 uses motion vectors calculated based on the luma components for both chroma components and luma components. Mode select unit 204 may also generate syntax elements associated with the video blocks and the video slice for use in decoding the video blocks of the video slice.

Intra prediction unit 224 may intra predict a current block, as an alternative to the inter prediction performed by motion estimation unit 222 and motion compensation unit 220. In particular, intra prediction unit 224 may determine an intra coding mode to use to encode a current block. In some examples, intra prediction unit 224 may encode a current block using various intra prediction modes, e.g., during separate encoding passes, and intra prediction unit 224 (or mode select unit 204, in some examples) may select an appropriate intra coding mode to use from the tested modes.

For example, intra prediction unit 224 may calculate rate-distortion values using a rate-distortion analysis for the various tested intra coding modes and select the intra coding mode having the best rate-distortion characteristics among the tested modes. Rate-distortion analysis generally determines an amount of distortion (or error) between an encoded block and an original unencoded block, which was encoded to produce the encoded block, as well as a bitrate or number of bits used to produce the encoded block. Intra prediction unit 224 may calculate ratios from the distortions and rates for the various encoded blocks to determine which intra coding mode exhibits the best rate-distortion value for the block.

In addition, intra prediction unit 224 may be configured to code depth blocks of a depth map. For example, intra prediction unit 224 may use intra prediction modes from the base (2D) HEVC standard, a region boundary chain coding mode (CCM), a simplified or segment-wise depth coding mode (SDC), or a depth modeling mode (DMM) to code an intra predicted PU of a depth slice. In some examples, motion estimation unit 222 and motion compensation unit 220 may also be configured to code depth blocks of a depth map. Motion estimation unit 222 and motion compensation unit 220 may perform inter prediction according to the base (2D) HEVC standard or an Inter SDC mode to code an inter predicted PU of a depth slice.

Transform processing unit 210 applies the transform to the residual block, producing a block of residual transform coefficients. The transform may convert the residual information from a pixel value domain to a transform domain, such as a frequency domain. Transform processing unit 210 may perform transforms such as discrete cosine transforms (DCTs) or other transforms that are conceptually similar to DCT. Wavelet transforms, integer transforms, sub-band transforms, or other types of transforms could also be used. Transform processing unit 210 may send the resulting transform coefficients to quantization unit 212. In some examples, the transform process may be skipped.

Quantization unit 212 quantizes the transform coefficients to further reduce bit rate. The quantization process may reduce the bit depth associated with some or all of the coefficients. The degree of quantization may be modified by adjusting a quantization parameter. In some examples, quantization unit 212 may then perform a scan of the matrix including the quantized transform coefficients. Alternatively, entropy encoding unit 214 may perform the scan.

Following quantization, entropy encoding unit 214 entropy codes the quantized transform coefficients. For example, entropy encoding unit 214 may perform context adaptive binary arithmetic coding (CABAC) or other entropy coding processes, such as context adaptive variable length coding (CAVLC), syntax-based context-adaptive binary arithmetic coding (SBAC), or probability interval partitioning entropy (PIPE) coding. In the case of context-based entropy coding, context may be based on neighboring blocks. Following the entropy coding by entropy encoding unit 214, the encoded bitstream may be transmitted to another device (e.g., video decoder 300) or archived for later transmission or retrieval.

Inverse quantization unit 230 and inverse transform unit 232 apply inverse quantization and inverse transformation, respectively, to reconstruct the residual block in the pixel domain for later use as a reference block. Motion compensation unit 220 may calculate a reference block by adding the residual block to a predictive block of one of the frames of decoded picture buffer 206. Motion compensation unit 220 may also apply one or more interpolation filters to the reconstructed residual block to calculate sub-integer pixel values for use in motion estimation.

Summer 234 adds the reconstructed residual block to the motion compensated prediction block produced by motion compensation unit 220 to produce a reconstructed video block for storage in decoded picture buffer 206. The reconstructed video block may be used by motion estimation unit 222 and motion compensation unit 220 as a reference block to inter-code a block in a subsequent video frame.

According to the techniques described in this disclosure, video encoder 200 may be configured to encode depth data for 3D video data using depth intra coding modes available in a 3D video coding process. In one example, video encoder 200 signals depth intra coding modes used to code depth data for 3D video data in a depth modeling table. The depth modeling table signals the syntax for the additional depth intra coding modes separate from the syntax for the HEVC intra coding modes. In addition, video encoder 200 signals a syntax element, such as a flag, to indicate whether any of the depth intra coding modes that are different from the HEVC intra coding modes are enabled for the 3D video data. In some examples, the syntax element may indicate whether all of the depth intra coding modes are enabled for the 3D video data. The syntax element may be included in one of a video parameter set (VPS), a sequence parameter set (SPS), or a picture parameter set (PPS) of the video data. When the depth intra coding modes are enabled, the flag signaled by video encoder 200 indicates to video decoder 300 to decode the depth modeling table to determine the one of the depth intra coding modes used to code the depth data. The depth modeling table may be encoded at one of a coding unit (CU) level or a prediction unit (PU) level of the video data. The signaling of video encoder 200, in accordance with the techniques of this disclosure, may reduce the decoder parsing burden by signaling the depth intra coding modes in the depth modeling table separate from the HEVC intra coding modes and indicating when the depth intra coding modes are enabled and the depth modeling table be decoded.

In another example, video encoder 200 may be configured to signal residual information of depth data for 3D video data using a set of syntax elements unified across two or more of the depth coding modes. The depth coding modes may include the depth intra coding modes and the depth inter coding mode. The set of syntax elements may include a syntax element that indicates whether residual values are coded for any of the depth coding modes. The set of syntax elements may also include syntax elements that indicate an absolute value and a sign of residual values for any of the depth coding modes. By sharing the same set of syntax elements to indicate residual information for two or more of the depth coding modes, video encoder 200 may also unify context model selection and binarization methods for each of the shared syntax elements. In addition, for the depth intra coding modes, video encoder 200 may determine to not filter neighboring reference samples during generation of the residual values of the depth data. The encoding mechanisms and signaling of video encoder 200, in accordance with the techniques of this disclosure, may reduce decoder parsing burden and reduce a number of required context models and binarization methods by unifying the residual information syntax for the depth coding modes.

Figure 3:
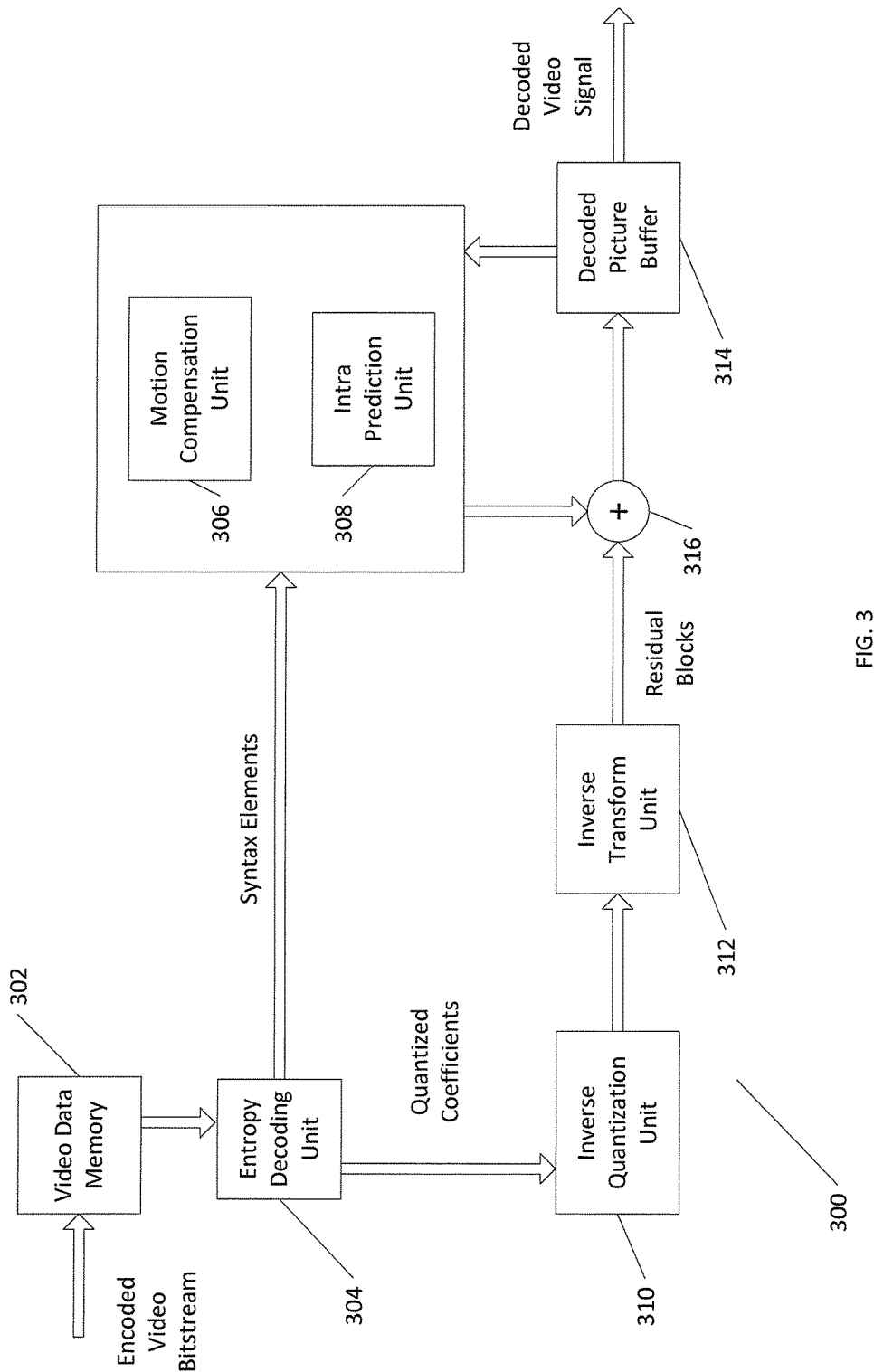
FIG. 3 illustrates a block diagram illustrating an example of a video decoder that may implement techniques for depth data coding.

FIG. 3 is a block diagram illustrating an example of video decoder 300 that may implement techniques for depth data coding. Video decoder 300 includes a video data memory 302, an entropy decoding unit 304, a motion compensation unit 306, an intra prediction unit 308, an inverse quantization unit 310, an inverse transform unit 312, a decoded picture buffer (DPB) 314, and a summer 316. Video decoder 300 represents a device that may be configured to perform techniques for simplified coding modes signaling of depth maps in 3D-HEVC as provided herein.

Video data memory 302 may store video data, such as an encoded video bitstream, to be decoded by the components of video decoder 300. The video data stored in video data memory 302 may be obtained, for example, from a computer-readable medium, e.g., from a local video source, such as a camera, via wired or wireless network communication of video data, or by accessing physical data storage media. Video data memory 302 may form a coded picture buffer (CPB) that stores encoded video data from an encoded video bitstream. Decoded picture buffer 314 may be a reference picture memory that stores reference video data for use in decoding video data by video decoder 300 by intra or inter coding modes. Video data memory 302 and decoded picture buffer 314 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 302 and decoded picture buffer 314 may be provided by the same memory device or separate memory devices. In various examples, video data memory 302 may be on-chip with other components of video decoder 300, or off-chip relative to those components.

During the decoding process, video decoder 300 receives an encoded video bitstream that represents video blocks of an encoded video slice and associated syntax elements from video encoder 200. Entropy decoding unit 304 entropy decodes the bitstream to generate quantized coefficients, motion vectors, intra coding mode indicators, and other syntax elements. Video decoder 300 may receive the syntax elements at the video slice level and/or the video block level. In addition to decoding texture maps (i.e., luma and chroma values) for each view, video decoder 300 may further decode a depth map for each view.

When a video slice is coded as an intra coded (I) slice, intra prediction unit 308 may generate prediction data for a video block of the current video slice based on a signaled intra coding mode and data from previously decoded blocks of the current frame or picture. Intra prediction unit 308 may also intra code depth data. For example, intra prediction unit 308 may use intra prediction modes from the base (2D) HEVC standard, a region boundary chain coding mode (CCM), a simplified depth coding or segment-wise DC coding (SDC) mode, or a depth modeling mode (DMM) to code an intra predicted PU of a depth slice.

When the video frame is coded as an inter-coded (i.e., B or P) slice, motion compensation unit 306 produces predictive blocks for a video block of the current video slice based on the motion vectors and other syntax elements received from entropy decoding unit 304. The predictive blocks may be produced from one of the reference pictures within one of the reference picture lists. Video decoder 300 may construct the reference frame lists using default construction techniques based on reference pictures stored in decoded picture buffer 314.

Motion compensation unit 306 determines prediction information for a video block of the current video slice by parsing the motion vectors and other syntax elements, and uses the prediction information to produce the predictive blocks for the current video block being decoded. For example, motion compensation unit 306 uses some of the received syntax elements to determine a prediction mode (e.g., intra or inter prediction) used to code the video blocks of the video slice, an inter-prediction slice type (e.g., B slice or P slice), construction information for one or more of the reference picture lists for the slice, motion vectors for each inter encoded video block of the slice, inter-prediction status for each inter-coded video block of the slice, and other information to decode the video blocks in the current video slice.

Motion compensation unit 306 may also perform interpolation based on interpolation filters. Motion compensation unit 306 may use interpolation filters as used by video encoder 200 during encoding of the video blocks to calculate interpolated values for sub-integer pixels of reference blocks. In this case, motion compensation unit 306 may determine the interpolation filters used by video encoder 200 from the received syntax elements and use the interpolation filters to produce predictive blocks. Motion compensation unit 306 may also use inter code depth data. For example, motion compensation unit 306 may perform inter prediction according to the base (2D) HEVC standard or an Inter SDC mode to code an intra predicted PU of a depth slice.

Inverse quantization unit 310 inverse quantizes, i.e., de-quantizes, the quantized transform coefficients provided in the bitstream and decoded by entropy decoding unit 304. The inverse quantization process may include use of a quantization parameter $QP_Y$ calculated by video decoder 300 for each video block in the video slice to determine a degree of quantization and, likewise, a degree of inverse quantization that should be applied. Inverse transform unit 312 applies an inverse transform, e.g., an inverse DCT, an inverse integer transform, or a conceptually similar inverse transform process, to the transform coefficients in order to produce residual blocks in the pixel domain.

After motion compensation unit 306 or intra prediction unit 308 generates the predictive block for the current video block (e.g. a texture block or a depth block) based on motion vectors or other syntax elements, video decoder 300 forms a decoded video block by summing the residual blocks from inverse transform unit 312 with the corresponding predictive blocks generated by motion compensation unit 306 or intra prediction unit 308. Summer 316 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 314, which stores reference pictures used for subsequent motion compensation. Decoded picture buffer 314 also stores decoded video for later presentation on a display device.

Motion compensation units 220 and 306 may perform Depth Based Block Partitioning (DBBP) which partitions a block into distinct partitions. An arbitrarily shaped block partitioning for the collocated texture block is derived based on a binary segmentation mask computed from the collocated (virtual) depth map. Each of the two partitions is motion compensated and afterwards merged based on the depth-based segmentation mask. A final step in the DBBP process is to filter pixels at the boundary of the partition. Though discussed herein as being partitioned into foreground and background object regions, the texture block may be partitioned in any desirable manner as dictated by the binary segmentation mask.

In an initial step, the collocated depth block of the current coded tree block (CTB) of the texture component is segmented into two arbitrarily shaped segments. As the depth component is coded after the corresponding texture view in the current Common Test Configuration (CTC), a virtual depth map is derived from the base view's reconstructed depth and shifted by a disparity vector. The disparity vector is used to locate a corresponding block of the current CU/PU in an already coded picture of the same time instance. The disparity vector is initially derived from a motion vector of spatial and temporal disparity compensated prediction coded neighboring blocks of the CU or from a disparity vector associated with a motion compensated prediction coded neighboring block of the CU. The disparity vector is then obtained from the depth map of the base view. The disparity vector is utilized to identify a depth block in an already coded depth view and perform backward warping for further improving accuracy of derived disparity vectors. The disparity vector obtained is known as a depth oriented neighboring block based disparity vector (DoNBDV).

Upon obtaining the disparity vector and identifying the corresponding depth block in a reference view, a threshold is calculated based on the average of all depth samples within the corresponding depth block. The segmentation of the (virtual) depth map is performed based on a very simple thresholding mechanism where the threshold $\bar{d}$ is computed from the mean depth value.

$$\bar{d} = \frac{1}{(2N)^2} \sum_{x=0}^{2N-1} \sum_{y=0}^{2N-1} d(x, y)$$

Here, 2N defines the width/height of the current texture block and d(x,y) resembles the already coded, corresponding depth map of the reference view's texture frame. Afterwards, a binary segmentation mask $m_D(x,y)$ is generated based on depth values and the threshold d as follows.

$$m_D(x, y) = \begin{cases} 1, & \text{if } d(x, y) \geq d \\ 0, & \text{otherwise} \end{cases}, \quad x, y \in [0, 2N-1]$$

Figure 4:
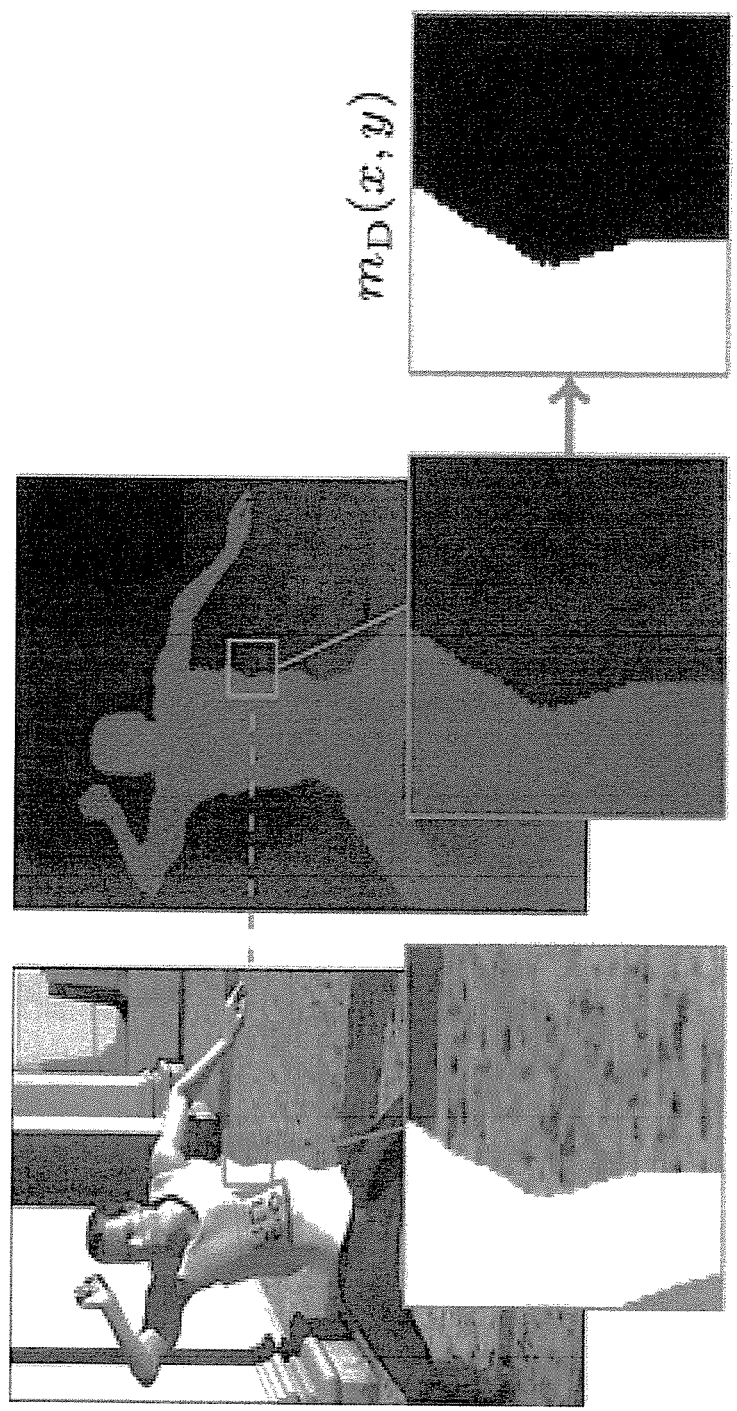
FIG. 4 illustrates a test sequence with magnified component blocks of a coding unit depicting a generation of a binary segmentation mask.

FIG. 4 shows a test sequence with magnified component blocks of a coding unit depicting the generation of the binary segmentation mask. The collocated depth block partitions the block into foreground and background regions resulting in the binary segmentation mask $m_D(x,y)$. The mean value of the resulting binary segmentation mask defines the shape of the partitioning of the texture block. When the depth value located at the relevant coordinate (x,y) is larger than the threshold, the binary mask $m_D(x,y)$ is set to 1. When the depth value located at the relevant coordinate (x,y) is smaller than the threshold, the binary mask $m_D(x,y)$ is set to 0.

In the DBBP scheme, the actual motion or disparity compensation is performed on a 2N×2N partitioning, which means that the full CTB is shifted by the coded vector information. This full-size motion/disparity compensation is performed twice, once for each segment, and results in two prediction signals $p_{T0}(x,y)$ and $p_{T1}(x,y)$. Consequently, two sets of vector information need to be coded for a DBBP block. The assumption behind this approach is that a texture block is typically segmented into foreground and background based on the collocated depth block. These two depth layers can then be compensated independently by their own sets of motion or disparity vectors.

After having generated two full-size prediction signals $p_{T0}(x,y)$ and $p_{T1}(x,y)$ for a DBBP-coded block, the segmentation mask $m_D(x,y)$ is used to merge these into the final prediction signal $p_T(x,y)$ for the current texture CTB as follows:

$$p_T(x, y) = \begin{cases} p_{T0}(x, y), & \text{if } m_D(x, y) = 1 \\ p_{T1}(x, y), & \text{otherwise} \end{cases}, \quad x, y \in [0, 2N-1]$$

Figure 5:
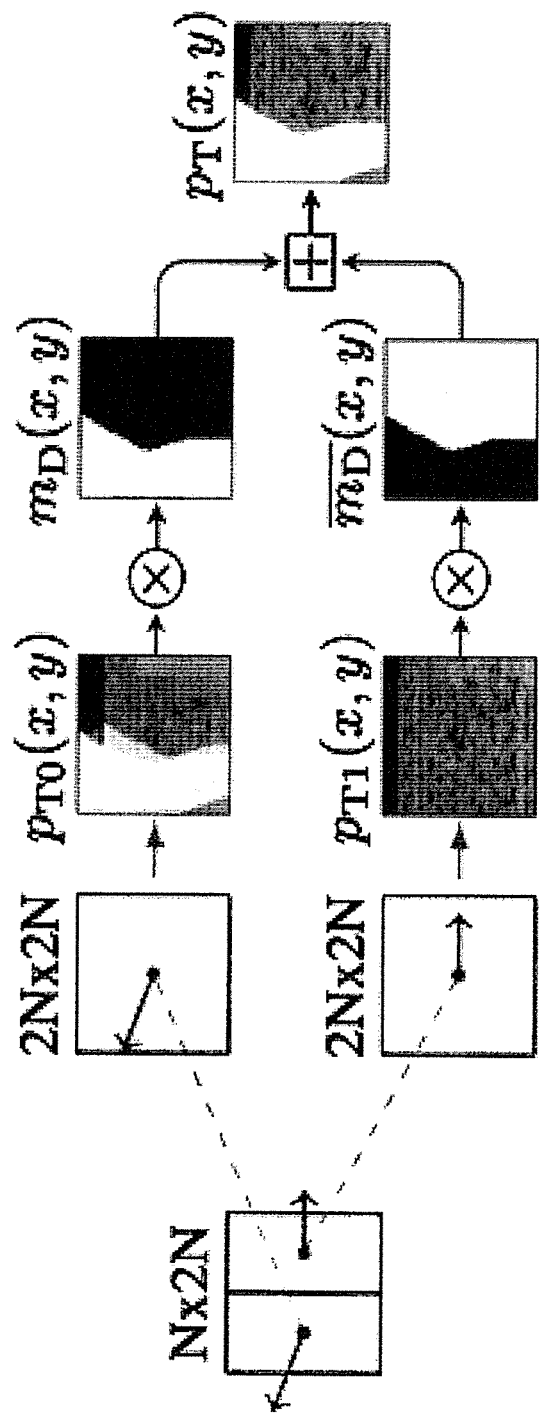
FIG. 5 illustrates a merging function of two partitions created by the binary segmentation mask.

FIG. 5 shows the merging function. For each of the two decoded motion parameters, a 2N×2N motion compensation is performed. The resulting prediction signals $p_{T0}(x,y)$ and $p_{T1}(x,y)$ are combined using the DBBP mask $m_D(x,y)$. By merging the two prediction signals, shape information from the depth map allows for independent compensation of foreground and background objects in the same texture block. At the same time, DBBP does not require pixel-wise motion/disparity compensation. Memory access to the reference buffers is always regular (block-based) for DBBP-coded blocks. Moreover, DBBP always uses full-size blocks for compensation. This is preferable with respect to complexity, because of the higher probability of finding the data in the memory cache.

In the above description, DBBP partitions a block into foreground and background object regions. After the prediction signal for each partition is generated, boundary sample filtering is applied to change the intensity values of the boundary samples. In the boundary sample filtering method, a checking condition based on the neighboring samples of the current boundary sample is applied to determine if boundary sample filtering is used to change the intensity value of the current boundary sample. If the checking condition is satisfied, a filtering technique is applied to the current boundary sample. The filtering technique may be based on using multiple position samples to generate an update value for the current position as the filtered sample value. The multiple position samples include neighboring position samples of the current boundary sample, including or not including the current boundary sample as well.

Figure 6:
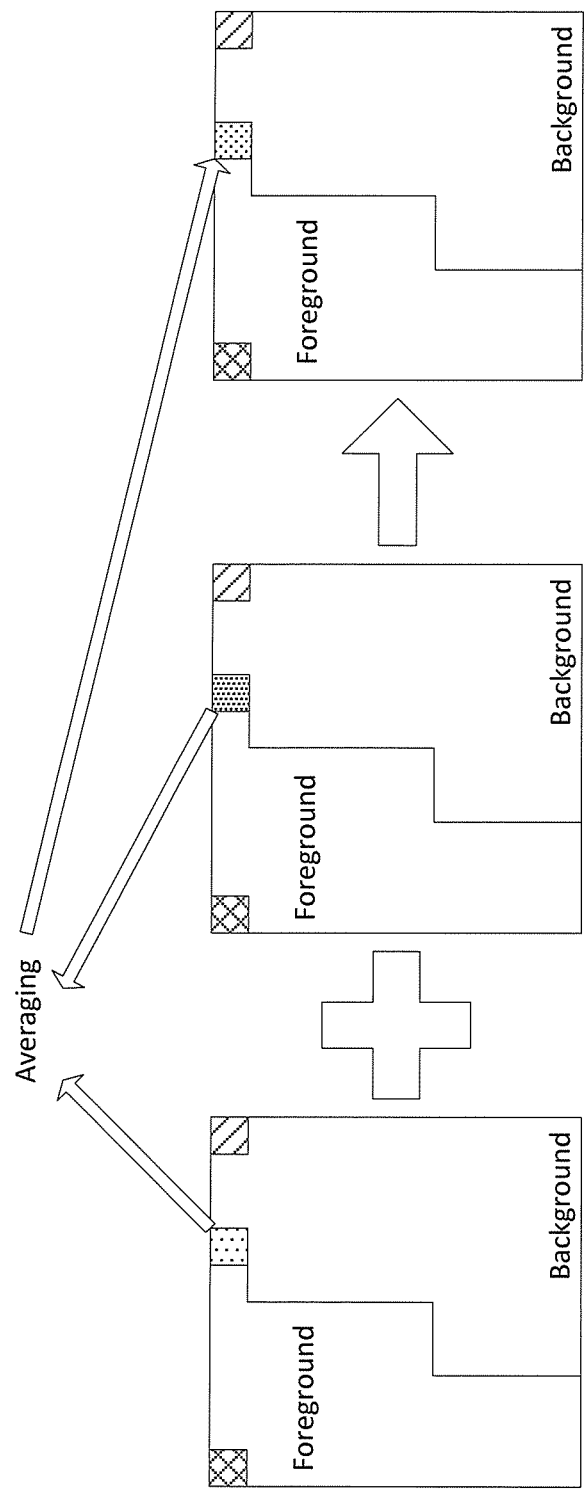
FIG. 6 illustrates an averaging filtering technique for a particular pixel at a partition boundary.

FIG. 6 shows an averaging filtering technique for a particular pixel at the partition boundary. While motion or disparity compensation in a modern video coder (e.g. in HEVC) is performed on a block-basis, an arbitrarily shaped block partitioning typically requires pixel-based compensation. After the above prediction signal is generated from the merging process, a horizontal or vertical filtering process is performed on the pixels at the boundary partition defined by the segmentation mask. In the case of the foreground or the background pixel near the partition, one attempt at filtering has been to average the value of the pixel of the two partitions. However, the collocated pixel is not classified to either foreground or background. Hence, it might result in distortion near the boundary.

Figure 7:
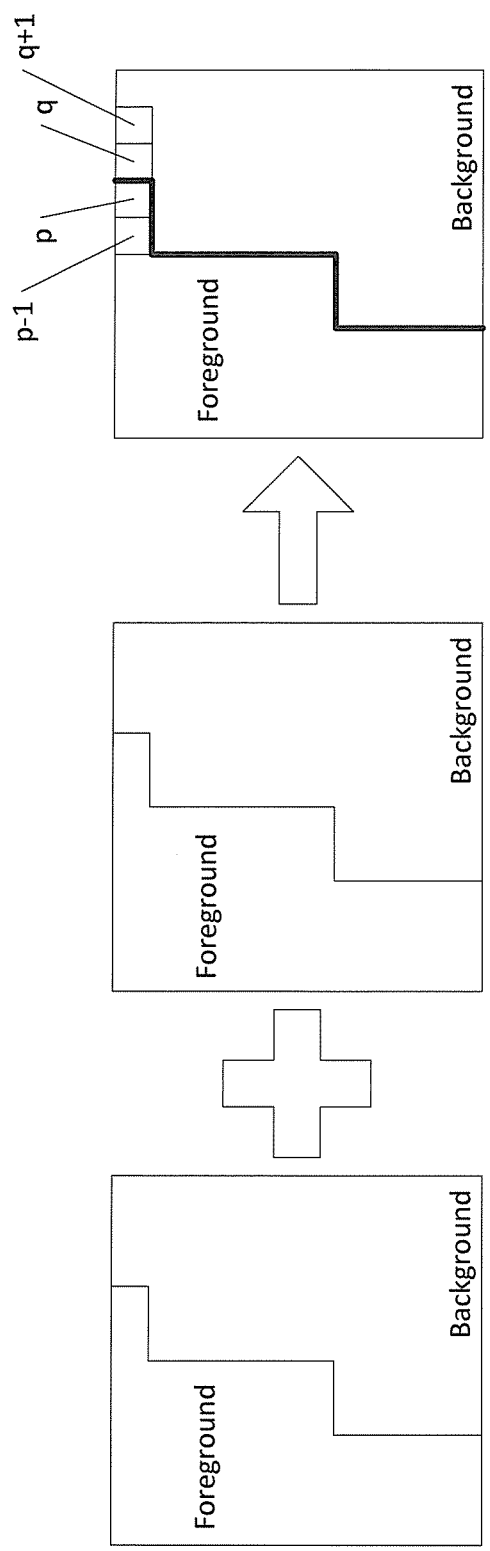
FIG. 7 illustrates a simple filtering technique performed on boundary pixels of the two partitions.

FIG. 7 shows a simple filtering technique performed on the boundary pixels p and q, instead of the averaging technique of FIG. 6. The filtering direction is based on PU size. A horizontal filter is performed for N×2N and a vertical filter is performed for 2N×N. As shown, one boundary sample in one partition has a position p and the boundary sample in the other partition has position q. The neighboring positions are at p−1 and q−1. For each color component I, the intensity values of positions p and q may be changed as follows:

$$I'_p = ((I_{p-1}) + (I_p) << 1 + (I_q)) >> 2$$

$$I'_q = ((I_p) + (I_q) << 1 + (I_{q+1})) >> 2$$

where p−1, p, q, and q+1 are consecutive samples of one row and $I'_p$ and $I'_q$ are the new intensity values of positions p and q after filtering. The symbol >> indicates a right bitshift operator (or power of two multiplication) and << indicates a left bitshift operator (or power of two multiplication) with the accompany integer value identifying the power of two 2 multiplication factor. For each current sample position, two nearest neighboring sample positions along the horizontal or vertical filtering direction are used to decide whether the current sample position is a boundary sample. If the two neighboring samples are assigned to the same value according to the binary segmentation mask, the current sample position is identified as a boundary sample position. This filtering process smooths the regions around the arbitrary partition in a more efficient manner.

Figure 8A:
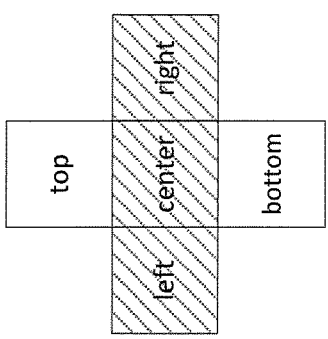
FIGS. 8A-8D illustrate four filtering conditions that may be checked for application of a filtering process on the boundary pixels.
Figure 8B:
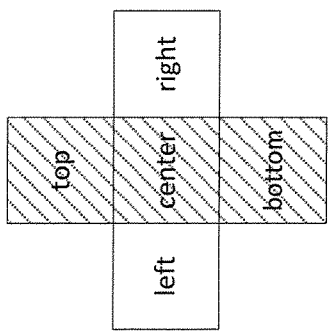
Figure 8C:
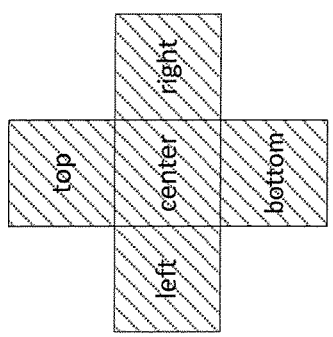
Figure 8D:
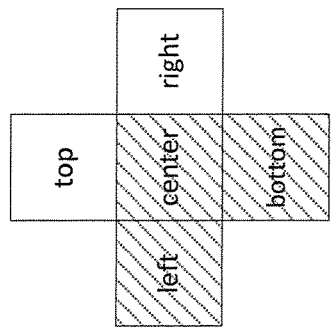

FIGS. 8A-8D show four filtering conditions that may be checked for the pixel filtering process. The boundary filtering process may be further simplified where filtering does not need to be performed for each pixel position. Filtering conditions may be established based on the mask values of neighboring pixel positions. A filtering mask is applied to each pixel position. The filtering mask is for the left, right, top, bottom, and center where the current pixel position is in the center of the mask. In FIGS. 8A-8D, hashing represents positions having a same value. FIG. 8A shows the case where the left and right pixel positions share a same mask value with the center current pixel position in a horizontal row while the top and bottom pixel positions do not share a same value with the center current pixel position in a vertical column. FIG. 8B shows the case where the top and bottom pixel positions share a same mask value with the center current pixel position in a vertical column while the left and right pixel positions do not share a same mask value with the center current pixel position in a horizontal row. FIG. 8C shows the case where the left, right, top, and bottom pixel positions all share a same mask value with the center current pixel position. FIG. 8D shows the case where the left and right pixel positions do not share a same mask value with the center current pixel position in a horizontal row and the top and bottom pixel positions do not share a same mask value with the center current pixel position in a vertical column.

For each pixel position at the boundary of the binary segmentation mask, the values of the left, right, top, and bottom pixel positions are compared to a value of the center current pixel position to determine what filtering process is to be applied.

Figure 9A:
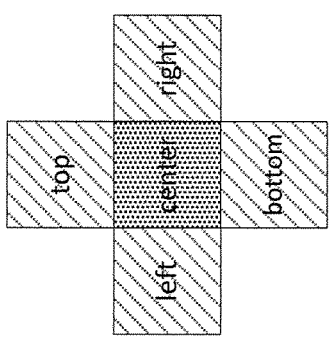
FIGS. 9A-9B illustrate a further simplification to the condition checking of FIGS. 8A-8D.
Figure 9B:
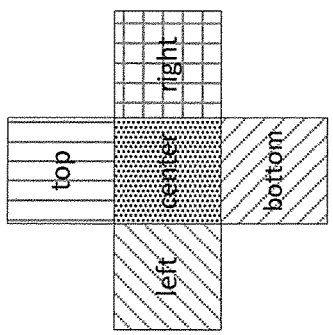

For the case presented in FIG. 8A, the filtering process may be $I'_c=((I_t)+(I_c)<<1+(I_b))>>2.$ For the case presented in FIG. 8B, the filtering process may be $I'_c=((I_l)+(I_c)<<1+(I_r))>>2.$ For the case presented in FIG. 8C, no filtering is performed and $I'_c=(I_c).$ For the case presented in FIG. 8D, the filtering process may be $I'_c=((I_l)+(I_r)+(I_c)<<2+(I_t)+(I_b))>>3.$ FIGS. 9A-9B show a further simplification to the filtering process. Instead of checking five positions and four filtering cases, the mask checking process can be reduced to four positions and two filtering cases. In FIGS. 9A-9B, only the values of pixels adjacent to the current pixel position in vertical and horizontal planes in relation to the current pixel position (i.e., the left, right, top, and bottom pixel positions in relation to a center current pixel position) are checked. The current center pixel position is excluded in the checking conditions. FIG. 9A shows the case where the left, right, top, and bottom pixel positions share a same mask value. FIG. 9B shows the case where the left, right, top, and bottom pixel positions do not share a same mask value.

For the case presented in FIG. 9A, no filtering is performed and $I'_c=(I_c).$

For the case presented in FIG. 9B, the filtering process may be $I'_c=((I_l)+(I_r)+(I_c)<<2+(I_t)+(I_b))>>3.$ Though a specific filtering process is shown, variations may be made to the filtering process, including using certain coefficients and/or not using certain intensity values as part of the filtering process. The filtering process may include computations such as averaging, weighted averaging, and median filtering, among any other desired computations.

Table 1 shows the test results using the Common Test Configuration (CTC) for HEVC. As shown by Table 1, no BD bit rate loss is incurred using the filtering conditions of FIGS. 9A-9B.

TABLE 1

| | V0 | V1 | V2 | PSNR/Vbr | PSNR/Tbr | Synt/Tbr | enc time | dec time | ren time |
|---|---|---|---|---|---|---|---|---|---|
| Balloons | 0% | .3% | .2% | 0.2% | 0.1% | 0.0% | 100.6% | 102.4% | 104.5% |
| Kendo | 0% | .1% | .1% | 0.1% | 0.0% | 0.0% | 98.5% | 91.8% | 98.3% |
| Newspaper | 0% | .1% | .1% | 0.1% | 0.0% | 0.1% | 98.1% | 103.9% | 99.6% |
| GTFly | 0% | 0% | 0% | 0.0% | 0.0% | −.1% | 101.1% | 118.9% | 101.6% |
| PoznanHll | 0% | .1% | 0% | 0.1% | 0.0% | 0.0% | 101.9% | 124.0% | 105.1% |
| PoznanSt | 0% | .1% | .2% | 0.0% | 0.0% | 0.1% | 101.0% | 94.8% | 96.2% |
| UndoDance | 0% | −.2% | −.1% | 0.0% | 0.0% | 0.0% | 101.5% | 104.8% | 101.7% |
| Shark | 0% | −.1% | 0% | 0.0% | 0.0% | 0.0% | 101.2% | 87.4% | 101.5% |
| 1024 × 768 | 0% | .1% | 0% | 0.1% | 0.0% | 0.0% | 99.1% | 99.4% | 100.8% |
| 1920 × 1088 | 0% | 0% | 0% | 0.0% | 0.0% | 0.0% | 101.3% | 106.0% | 101.2% |
| average | 0% | 0% | 0% | .01% | 0.0% | 0.0% | 100.5% | 103.5% | 101.1% |

Figure 10:
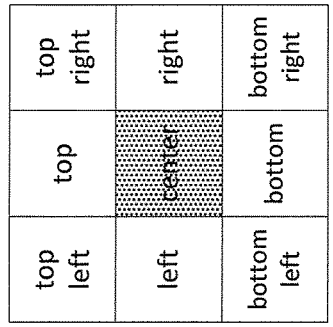
FIG. 10 illustrates an alternative to the checking condition simplification technique of FIGS. 9A-9B.

FIG. 10 shows an alternative technique to the checking condition and filtering process. The masks used for the filtering condition check is not limited to left, right, top, bottom, and center positions. Masks at positions adjacent to the left and right positions in a vertical plane in relation thereof (i.e., top left, top right, bottom left, and bottom right of the current pixel) could also be used for the checking condition and the filtering process. An example filtering process may be as follows:

$I'_c=(I_{tl}+I_t+I_{tr}+I_l+I_r+I_{bl}+I_b+I_{br}+(I_c<<3))>>4.$

The values at each position, or a specific combination of positions, may determine whether filtering is performed and what filtering process is applied.

In another embodiment, filter coefficients may be applied as desired in the filtering process. An example filtering process using filter coefficients may be as follows: such as:

$I'_c=a_1(I_l)+a_2(I_r)+a_3(I_c)+a_4(I_t)+a_5(I_b).$

If $a_1=a_2=a_3=a_4=a_5=\frac{1}{2}$, the filtered pixel value $I'_c$ will be the mean value of pixels $I_l$, $I_r$, $I_c$, $I_t$, and $I_b$. Any real number could be used as a filter coefficient.

In another embodiment, directional positions of boundary samples (e.g. left and bottom, top and right, top and left, or right and bottom) are selected to determine the checking condition for boundary samples. However, since the current center pixel position is not stable to be partitioned in one of the partition regions, the current center pixel position is excluded in determining the checking conditions.

In another embodiment, the two partitions are motion-compensated and then merged by averaging them based on the depth-based segmentation mask. After averaging, the boundary of the two partitions is then filtered in any manner described above for better reconstruction quality.

In another embodiment, the filter used for boundary filtering is not limited to smooth/low pass filters. Other filtering techniques may be used such as a median filter and a Gaussian filter, among other filters.

The various embodiments described above are mere examples of the checking conditions and filtering processes that may be applied for DBBP. Moreover, these embodiments are not exclusive of one another as features of two or more embodiments may be applied when performing the checking condition and filtering process for a pixel position.

As described in the previous section, DBBP requires coding two sets of motion information, one for each partitioned segment. A modern video coder, such as HEVC, allows using rectangular, non-square partitioning modes within a coding tree unit (CTU) for finer-grained motion compensation. For each of the partitions in a CTU, a separate set of motion information is coded. This coding scheme is reused in the depth-based block partitioning.

Figure 11:
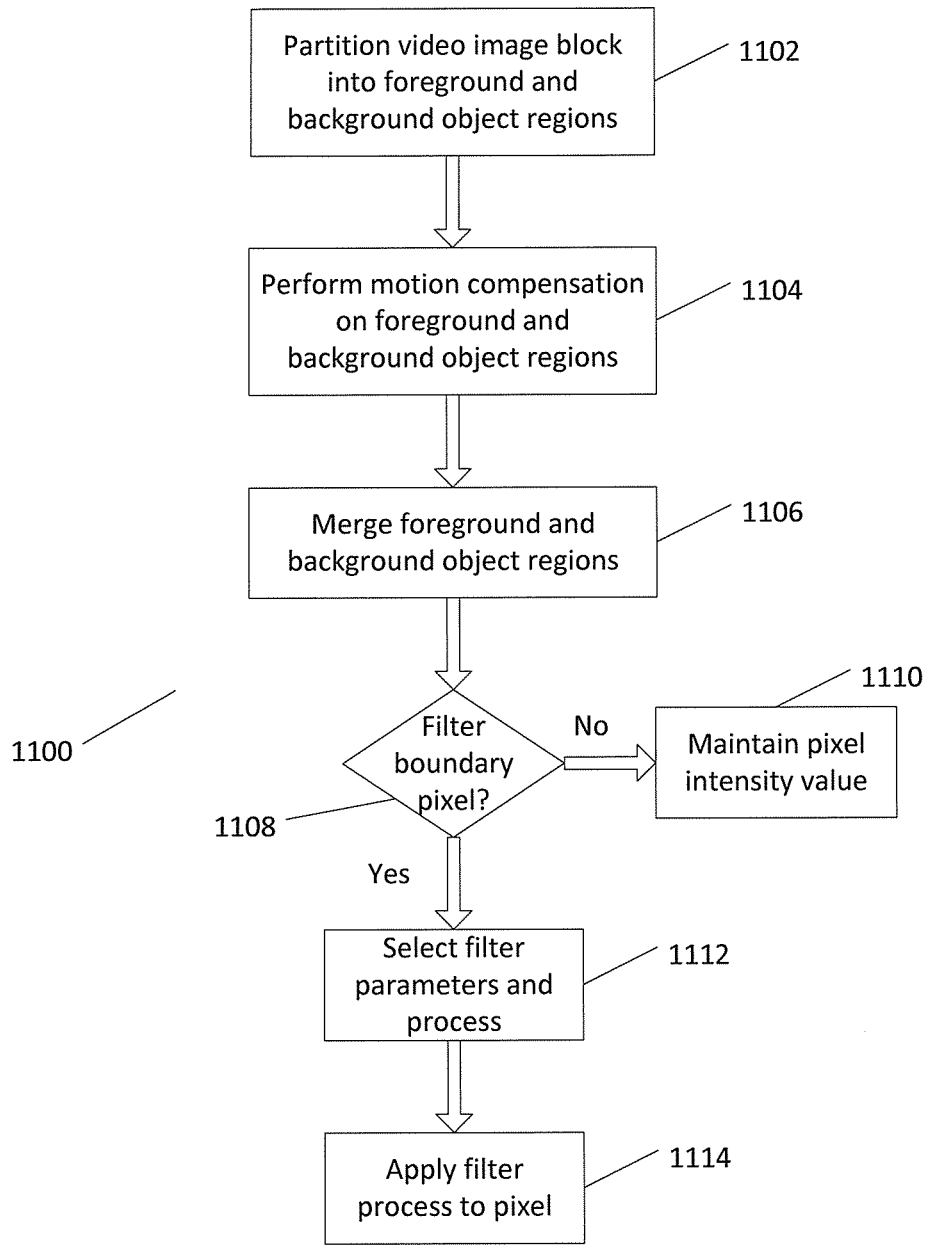
FIG. 11 illustrates a process for performing depth based block partitioning.

FIG. 11 shows a process 1100 in performing depth based block partitioning according to the present disclosure. Process 1100 begins at block 1102 where the video image block is partitioned into foreground and background object regions. At block 1104, motion compensation is performed on the foreground and background object regions. The foreground and background object regions are merged at block 1106. In the merge process, intensity values of boundary pixels may be optionally averaged. A determination is made at block 1108 for each pixel at the boundary of the foreground and background object regions whether a filter process is to be performed to adjust an intensity value for the particular pixel. One or more checking conditions described above may be used to determine whether a filtering process is to be applied. If not, the intensity value of the pixel is maintained at block 1110. If filtering is to be performed, filter parameters and a filtering process are selected at block 1112. The filter process is then applied to the particular pixel at block 1114 to obtain an intensity value.

Figure 12:
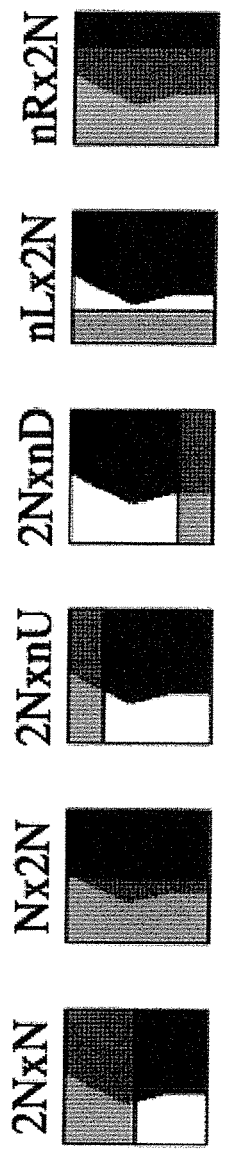
FIG. 12 shows the prediction unit shapes superimposed in relation to the binary segmentation mask.

FIG. 12 shows the PU shapes superimposed in relation to the binary segmentation mask. After the optimal motion/disparity information for each DBBP segment has been derived, this information is mapped into one of the available rectangular, non-square partitioning modes of HEVC discussed above. The mapping of the binary segmentation mask to one of the six available two-segment partitioning modes is performed by a correlation analysis. For each of the available partitioning modes $i \in [0,5]$, 2 binary masks $m_{2i}(x,y)$ and $m_{T2i+1}(x,y)$ are generated, where $m_{2i+1}(x,y)$ is the negation of $m_{2i}(x,y)$. To find the best matching partitioning mode $i_{opt}$ for the current depth-based segmentation mask $M_D(x,y)$, the following algorithm is performed:

$$k_{opt} = \underset{k}{\mathrm{argmax}} \sum_{x}^{2N-1} \sum_{y}^{2N-1} m_D(x,y) * m_k(x,y), \quad k \in [0, 11]$$

-continued $$i_{opt} = \left\lfloor \frac{k_{opt}}{2} \right\rfloor$$

$$b_{inv} = \begin{cases} 1, & \text{if } k_{opt} \text{ is odd} \\ 0, & \text{otherwise} \end{cases}$$

The Boolean variable $b_{inv}$ defines whether the derived segmentation mask $m_D(x,y)$ needs to be inverted or not. This might be necessary in some cases where the indexing of the conventional partitioning schemes is complementary to the indexing in the segmentation mask. In the conventional partitioning modes, index 0 always defines the partition in the top-left corner of the current block, while the same index in the segmentation mask defines the segment with the lower depth values (background objects). To align the positioning of the corresponding sets of motion information between $m_D(x,y)$ and $i_{opt}$, the indexing in $m_D(x,y)$ is inverted, if $b_{inv}$ set.

After having found the best matching conventional partitioning mode, motion information is stored and coded according to this optimal mode $i_{opt}$. Succeeding coding units (CUs) can access the already coded motion information conventionally when deriving motion vector candidates for advanced motion vector prediction (AMVP) or motion vector merging.

A single flag is added to the coding syntax to signal to the decoder that a block uses DBBP for prediction. An obvious choice would be to send this flag for all of the conventional partitioning modes. But this approach would result in unwanted coding overhead for blocks that do not use DBBP. Therefore, the partitioning mode for DBBP-coded blocks is set to 2N×N before coding the partitioning mode. Afterwards, only for 2N×N partitioned blocks, the DBBP flag is coded in the bitstream. For all other partitioning modes, the DBBP flag is not coded. At the decoder side, the true (conventional) partitioning is derived after having decoded the DBBP flag. All further processing steps at the decoder remain the same as in the HEVC base specification.

Figure 13:
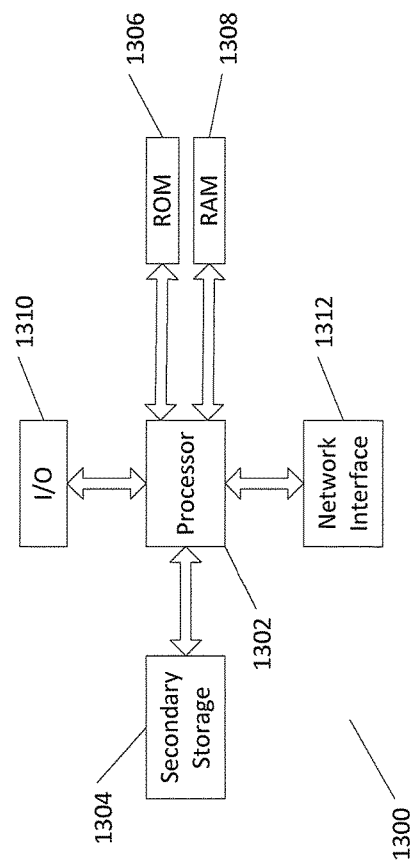
FIG. 13 illustrates a simplified, general-purpose computing component suitable for performing depth based block partitioning.

FIG. 13 illustrates a simplified, general-purpose computing component 1300 suitable for implementing one or more embodiments disclosed herein. The components described above for video encoder 200 and video decoder 300 may be implemented on any general-purpose computing component, such as a computer or network component with sufficient processing power, memory resources, and network throughput capability to handle the necessary workload placed upon it. The computing component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network/component connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304. Additional processors and memory devices may be incorporated based on the function of each component within video encoder 200 and video decoder 300.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method for providing block partition boundary filtering for depth based block partitioning in high efficiency video coding, comprising:
   obtaining a binary mask based on a depth block corresponding to a current texture block, in which the binary mask is used for the texture block partitioning;
   partitioning the current texture block according to the binary mask;
   determining that at least one pixel position of a first set of adjacent pixel positions in the binary mask in at least one of a vertical plane and a horizontal plane in relation to a first particular pixel position at the block partition boundary between different partitions in the current texture block has a different depth value in the binary mask than other pixel positions in the first set of adjacent pixel positions;
   determining that all pixel positions of a second set of adjacent pixel positions in the binary mask in at least one of a further vertical plane and a further horizontal plane in relation to a second particular pixel position at the block partition boundary between the different partitions in the current texture block have a same depth value;
   performing pixel processing to filter an intensity value in the current texture block at the first particular pixel position according to intensity values in the current texture block at the first set of pixel positions and not to filter an intensity value in the current texture block at the second particular pixel position; and
   updating the intensity value at the first particular pixel position in the current texture block according to the pixel processing.

2. The method of claim 1, wherein the pixel processing performed on the intensity value in the current texture block at the first particular pixel position comprises:
   combining the intensity values in the current texture block at the first set of pixel positions except for the intensity value at the first particular pixel position to generate a filtered intensity value in the current texture block at the first particular pixel position.

3. The method of claim 1, wherein the intensity value at the second particular pixel position in the current texture block remains at a current intensity value at the second particular pixel position in the texture block when each adjacent pixel position in the second set of pixel positions has the same depth value in the binary mask.

4. The method of claim 1, wherein the intensity value at the first particular pixel position in the current texture block is adjusted based on respective intensity values at the first set of adjacent pixel positions in the current texture block.

5. The method of claim 1, wherein:
   the depth values at the pixel positions in the vertical plane adjacent to the first particular pixel position include depth values in the binary mask at pixel positions to the left and right of the first particular pixel position in the vertical plane adjacent to the particular pixel position.

6. The method of claim 1, wherein:
   the depth values at the pixel positions in the vertical plane adjacent to the first particular pixel position include depth values in the binary mask at pixel positions in the horizontal plane above and below the first particular pixel position.

7. The method of claim 1, wherein the pixel processing performed to adjust the intensity value at the first particular pixel position of the current texture block includes at least one of averaging, weighted averaging, and median filtering computations.

8. The method of claim 1, further comprising, after obtaining the binary mask:
   performing motion vector processing based on the pixel positions in the binary mask having a first value according to a first motion vector to generate a first texture block;
   performing motion vector processing based on the pixel positions in the binary mask having a second value according to a second motion vector to generate a second texture block;
   combining the first and second texture blocks according to the block boundary to generate the current texture block.

9. A device for providing block partition boundary filtering for depth based block partitioning in high efficiency video coding, comprising:
   a memory configured to store data and instructions; and
   a processor, upon executing the instructions, is configured to:
   obtain a binary mask based on a depth block corresponding to a current texture block, in which the binary mask is used for the texture block partitioning;
   partition the current texture block according to the binary mask;
   determine that at least one pixel position of a first set of adjacent pixel positions in the binary mask in at least one of a vertical plane and a horizontal plane in relation to a first particular pixel position at the block partition boundary between different partitions in the current texture block has a different depth value in the binary mask than other pixel positions in the first set of adjacent pixel positions;

determine that all pixel positions of a second set of adjacent pixel positions in the binary mask in at least one of a further vertical plane and a further horizontal plane in relation to a second particular pixel position at the block partition boundary between the different partitions in the current texture block have a same depth value;

perform pixel processing to filter an intensity value in the current texture block at the first particular pixel position according to intensity values in the current texture block at the first set of pixel positions and not to filter an intensity value in the current texture block at the second particular pixel position; and update the intensity value at the first particular pixel position in the current texture block according to the pixel processing.

10. The device of claim 9, wherein the pixel processing performed on the pixel value in the current texture block at the first particular pixel position comprises:

combining the pixel values in the current texture block at the first set of pixel positions except for the pixel value at the first particular pixel position to generate a filtered pixel value in the current texture block at the first particular pixel position.

11. The device of claim 10, wherein the pixel processing performed to adjust the intensity value at the particular pixel position of the current texture block includes at least one of averaging, weighted averaging, and median filtering computations.

12. The device of claim 9, wherein the intensity value at the second particular pixel position of the current texture block remains at a current intensity value at the second particular pixel position in the texture block when each adjacent pixel position in the second set of pixel positions has the same depth value in the binary mask.

13. The device of claim 9, wherein the intensity value at the first particular pixel position in the current texture block is adjusted based on respective intensity values at the first set of adjacent pixel positions in the current texture block.

14. The device of claim 9, wherein:

the depth values at the pixel positions in the vertical plane adjacent to the first particular pixel position include depth values in the binary mask at pixel positions to the left and right of the first particular pixel position in the vertical plane adjacent to the particular pixel position.

15. The device of claim 9, wherein:

the depth values at the pixel positions in the vertical plane adjacent to the first particular pixel position include depth values in the binary mask at pixel positions in the horizontal plane above and below the first particular pixel position.

16. The device of claim 9, wherein the processor, upon executing the instructions, is further configured to:

perform motion vector processing based on the pixel positions in the binary mask having a first value according to a first motion vector to generate a first texture block;

perform motion vector processing based on the pixel positions in the binary mask having a second value according to a second motion vector to generate a second texture block;

combine the first and second texture blocks according to the block boundary to generate the current texture block.

17. A non-transitory computer readable medium including code for providing block partition boundary filtering for depth based block partitioning in high efficiency video coding, the code upon execution operable to:

obtain a binary mask based on a depth block corresponding to a current texture block, in which the binary mask is used for the texture block partitioning;

partition the current texture block according to the binary mask;

determine that at least one pixel position of a first set of adjacent pixel positions in the binary mask in at least one of a vertical plane and a horizontal plane in relation to a first particular pixel position at the block partition boundary between different partitions in the current texture block has a different depth value in the binary mask than other pixel positions in the first set of adjacent pixel positions;

determine that all pixel positions of a second set of adjacent pixel positions in the binary mask in a further vertical plane and a further horizontal plane in relation to a second particular pixel position at the block partition boundary between the different partitions in the current texture block have a same depth value;

perform pixel processing to filter an intensity value in the current texture block at the first particular pixel position according to intensity values in the current texture block at the first set of pixel positions and not to filter an intensity value in the current texture block at the second particular pixel position; and update the intensity value at the first particular pixel position in the current texture block according to the pixel processing.

18. The computer readable medium of claim 17, wherein the depth values at the pixel positions in the vertical plane adjacent to the first particular pixel position include depth values in the binary mask at pixel positions to the left and right in the vertical plane adjacent to the first particular pixel position.

19. The computer readable medium of claim 17, wherein the pixel processing performed to adjust the intensity value at the particular pixel position of the current texture block includes at least one of averaging, weighted averaging, and median filtering computations.

* * * * *

UNITED STATES PATENT AND TRADEMARK OFFICE
CERTIFICATE OF CORRECTION

PATENT NO. : 10,057,586 B2
APPLICATION NO. : 14/752072
DATED : August 21, 2018
INVENTOR(S) : Gu et al.

Page 1 of 1

It is certified that error appears in the above-identified patent and that said Letters Patent is hereby corrected as shown below:

In the Specification

In Column 14, Line 63, delete "$a_1=a_2=a_3=a_4=a_5=½$," and insert --$a_1=a_2=a_3=a_4=a_5=1/5$,-- therefor Signed and Sealed this
Twenty-eighth Day of May, 2019

Andrei Iancu
*Director of the United States Patent and Trademark Office*